(12) United States Patent
Xue

(10) Patent No.: US 11,929,913 B2
(45) Date of Patent: Mar. 12, 2024

(54) METHOD FOR CREATING DATA TRANSMISSION ENTRY AND RELATED DEVICE

(71) Applicant: Huawei Technologies Co., Ltd., Shenzhen (CN)

(72) Inventor: Wan Xue, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/827,483

(22) Filed: May 27, 2022

(65) Prior Publication Data

US 2022/0286381 A1  Sep. 8, 2022

Related U.S. Application Data

(63) Continuation of application No. PCT/CN2020/131340, filed on Nov. 25, 2020.

(30) Foreign Application Priority Data

Nov. 30, 2019 (CN) .......................... 201911208406.8
Sep. 28, 2020 (CN) .......................... 202011041288.9

(51) Int. Cl.
 *G06F 15/173* (2006.01)
 *H04L 45/00* (2022.01)
 *H04L 45/121* (2022.01)
 *H04L 45/42* (2022.01)
 *H04L 45/745* (2022.01)

(52) U.S. Cl.
 CPC ............ *H04L 45/121* (2013.01); *H04L 45/42* (2013.01); *H04L 45/566* (2013.01); *H04L 45/745* (2013.01)

(58) Field of Classification Search
 CPC ............................. H04L 45/42; H04L 45/745
 See application file for complete search history.

(56) References Cited

U.S. PATENT DOCUMENTS

| 2009/0158006 A1 | 6/2009 | Nam |
| 2012/0051236 A1* | 3/2012 | Hegde ................. H04L 63/1441 370/252 |
| 2012/0331542 A1 | 12/2012 | Halpern |

(Continued)

FOREIGN PATENT DOCUMENTS

| CN | 101582888 A | 11/2009 |
| CN | 102325076 A | 1/2012 |

(Continued)

OTHER PUBLICATIONS

Ping et al., "DOS Attack and Defense in Mobile Ad Hoc Networks," Journal of Computer Research and Development, vol. 42, No. 4, Total 8 pages (2005). With an English Abstract.

*Primary Examiner* — Padma Mundur

(74) *Attorney, Agent, or Firm* — Leydig, Voit & Mayer, Ltd.

(57) ABSTRACT

A method for creating a data transmission entry and a related device are provided, which are used in the communication field. The method includes: a source node receives a first packet sent by a destination node, wherein content of the first packet includes a destination address of a data packet; and the source node creates, depending on whether the destination address of the data packet is an address of a service supported by the source node, an entry associated with the first packet.

19 Claims, 7 Drawing Sheets

(56) References Cited

U.S. PATENT DOCUMENTS

| | | | | |
|---|---|---|---|---|
| 2014/0215047 A1* | 7/2014 | Li | ..................... | H04L 49/9084 |
| | | | | 709/223 |
| 2014/0233565 A1* | 8/2014 | Mahapatra | .............. | H04L 45/16 |
| | | | | 370/392 |
| 2014/0301395 A1* | 10/2014 | Khanal | ................. | H04L 45/021 |
| | | | | 370/392 |
| 2016/0021062 A1* | 1/2016 | Pan | ...................... | G06F 40/205 |
| | | | | 726/13 |
| 2017/0124513 A1 | 5/2017 | Boss et al. | | |
| 2019/0280977 A1* | 9/2019 | Ratcliff | ................... | H04L 45/38 |

FOREIGN PATENT DOCUMENTS

| | | |
|---|---|---|
| CN | 104219150 A | 12/2014 |
| CN | 105099920 A | 11/2015 |
| CN | 105490961 A | 4/2016 |
| CN | 106789640 A | 5/2017 |
| CN | 107070797 A | 8/2017 |
| CN | 107800626 A | 3/2018 |
| CN | 108476417 A | 8/2018 |
| EP | 2244495 A1 | 10/2010 |
| WO | 2012159481 A1 | 11/2012 |
| WO | 2013078847 A1 | 6/2013 |
| WO | 2017113238 A1 | 7/2017 |

* cited by examiner

METHOD FOR CREATING DATA TRANSMISSION ENTRY AND RELATED DEVICE

CROSS-REFERENCE TO RELATED APPLICATIONS

This application is a continuation of International Application No. PCT/CN2020/131340, filed on Nov. 25, 2020, which claims priority to Chinese Patent Application No. 201911208406.8, filed on Nov. 30, 2019 and to Chinese Patent Application No. 202011041288.9, filed on Sep. 28, 2020. The disclosures of the aforementioned applications are incorporated herein by reference in their entireties.

TECHNICAL FIELD

Embodiments of this application relate to the communication field, and in particular, to a method for creating a data transmission entry and a related device.

BACKGROUND

To improve data forwarding efficiency, as a network layer protocol, a second-generation standard protocol IPv6 provides a plurality of data transmission mechanisms. For example, a routing device is no longer supported in fragmenting a data packet. Instead, a source node uses a path maximum transmission unit (PMTU) discovery mechanism to obtain a PMTU value that is from the source node to a destination node, and then the source node uses the PMTU value to determine a length of a data packet sent by the source node. Alternatively, a neighbor discovery (ND) protocol is used to replace an address resolution protocol (ARP), and a media access control MAC address of a peer end is obtained by exchanging packets.

In a conventional technology, the source node creates different entries based on obtained packets, and forwards data packets based on content of the various entries. Because a quantity of entries is limited, a new entry may overwrite an old entry. Especially when a packet flood attack occurs, the source node creates a large quantity of entries. As a result, entries related to important services of the source node are overwritten by entries of attacking packets, and the source node cannot accurately transmit data packets related to the important services of the source node. Consequently, services of the source node are interrupted.

SUMMARY

In view of this, embodiments of this application provide a method for creating a data transmission entry and a related device, to prevent a data transmission entry corresponding to an important service of a network element device from being overwritten.

According to a first aspect, an embodiment of this application provides a method for creating a data transmission entry.

For a source node, links of important services supported by the source node are definite, and destination addresses of these services are definite and identifiable. When communicating with a destination node corresponding to a service of the source node, the source node needs to send a data packet based on entries corresponding to various forwarding mechanisms. Therefore, before sending the data packet, the source node needs to create corresponding entries based on various discovery mechanisms. Specifically, the source node needs to receive a first packet sent by the destination node, where content of the first packet includes a destination address of the data packet. Then, the source node determines, based on the destination address, whether the destination address is an address of a service supported by the source node, and then creates an entry based on a determining result. The created entry corresponds to the content of the first packet.

Before creating entries, the source node identifies destination addresses of data packets carried in first packets, classifies the received first packet depending on whether the destination addresses are addresses of services supported by the source node, and then creates different entries for the different first packets. In this way, it can be avoided that an entry corresponding to a service supported by the source node is overwritten because there is no difference between entries, so that the entry of the service supported by the source node is reserved, and then a data packet of the supported service can be sent based on the entry, to avoid service interruption.

In a possible implementation, a type of the first packet may be a packet too big PTB packet, or may be a neighbor discovery ND packet. For example, if the first packet is the PTB packet, the source node may determine whether a source address and a destination address carried in the PTB packet are an address pair corresponding to a service supported by the source node, and then create a PMTU entry based on a determining result, so that the source node fragments the sent data packet based on the PMTU entry. If the first packet is the ND packet, the source node may determine whether a destination address carried in the ND packet is an address corresponding to a service supported by the source node, and then create an ND entry based on a determining result. In this way, the source node can obtain a MAC address corresponding to the destination address, to complete data transmission of the data packet between a layer 3 network and a layer 2 network.

In a possible implementation, the source node may choose to create a first table, where each entry of the table has priority information used to indicate a priority of the entry. When the source node determines that the destination address of the data packet carried in the first packet is the address of the service supported by the source node, the source node may create an entry in the first table for the first packet, and determine a priority of the entry as a first priority. If a destination address of a data packet carried in another first packet of a same type is not the address of the service supported by the source node, the source node may create another entry in the first table for the first packet, and determine a priority of the entry as a second priority.

When creating an entry in the first table based on the first packet, the source node determines an entry corresponding to an address of a service supported by the source node as the first priority, and determines an entry corresponding to another address as the second priority. In this way, all entries may be distinguished between, to easily perform subsequent processing on an important service, that is, a first priority entry, so that the entry is not overwritten or deleted. In this way, the source node may find the entry corresponding to the supported service at any time, and transmit the data packet of the supported service, so that service data transmission interruption is avoided.

In a possible implementation, if the first packet received by the source node is the PTB packet, the source node needs to create a path maximum transmission unit PMTU entry based on the PTB packet. Specifically, the PTB packet carries the source address and the destination address of the data packet, and a maximum transmission unit MTU value of a routing device. The source node first determines whether the source address and the destination address of the data packet are the address pair of the service supported by the source node; if the source address and the destination address of the data packet are an address pair of the service supported by the source node, the source node creates a first priority entry for the PTB packet; or if the source address and the destination address of the data packet are not an address pair of the service supported by the source node, the source node needs to create a second priority entry for the PTB packet, where both the first priority entry and the second priority entry are PMTU entries.

When creating the entry in the first table based on the PTB packet, the source node determines a PMTU entry corresponding to the address pair of the service supported by the source node as the first priority, and determines a PMTU entry corresponding to another address pair as the second priority. In this way, all PMTU entries can be distinguished between, to easily perform subsequent processing on an important service, that is, the PMTU entry of the first priority, so that the PMTU entry is not overwritten or deleted. In this way, the source node may find the PMTU entry corresponding to the supported service at any time, and transmit the data packet of the supported service, so that service data transmission interruption is avoided.

In a possible implementation, if the first packet received by the source node is the neighbor discovery ND packet, the source node needs to create a neighbor cache entry based on the neighbor discovery ND packet. The neighbor discovery ND packet carries the destination address of the data packet and a media access control MAC address. It may be understood that both the first priority entry and the second priority entry are neighbor cache entries, including a destination address and a media access control MAC address of a target node.

In a possible implementation, when the source node receives one first packet, and a destination address and/or a source address of a data packet carried in the packet are/is the address pair/address of the service supported by the source node, the source node needs to create an entry whose priority is the first priority for the first packet. Before creating the entry, the source node needs to first determine whether a blank entry exists in the first table or whether the first table is full. When the blank entry still exists in the first table, the entry corresponding to the first packet may be directly created in the blank entry, and the priority of the entry is determined as the first priority. If the entry is full, an entry that is not the service supported by the source node may be overwritten. For example, the source node may determine, from entries whose priorities are the second priority, a target entry with shortest aging time. The source node creates the entry for the first packet, overwrites the target entry, and determines that the priority of the newly added entry is the first priority.

When the first table storing a plurality of entries is insufficient, the source node needs to filter each entry, and select the entry that is not the service supported by the source node to overwrite, to be specific, reserve the first priority entry corresponding to the service of the source node, and overwrite the second priority entry. In this way, the source node can find the first priority entry at any time, and properly transmit the data packet of the service supported by the source node, so that service data transmission interruption is avoided.

In a possible implementation, when the destination address and/or the source address of the data packet carried in the first packet received by the source node are/is not the address pair/address of the service supported by the source node, the source node still needs to create an entry whose priority is the second priority for the first packet. Before creating the entry, the source node needs to first determine whether a blank entry exists in the first table or whether the first table is full. When the blank entry still exists in the first table, the entry corresponding to the first packet may be directly created in the blank entry, and the priority of the entry is determined as the second priority. If the entry is full, an existing second priority entry may be overwritten, but a first priority entry cannot be overwritten. In other words, the source node may determine, from entries whose priorities are the second priority, a target entry with shortest aging time. The source node creates the entry for the first packet, overwrites the target entry, and determines that the priority of the newly added entry is the second priority.

When creating a new entry, the source node can overwrite only an entry of the service that is not supported by the source node, but cannot overwrite the first priority entry of the service supported by the source node. In this way, the source node can find the first priority entry at any time, and properly transmit the data packet of the service supported by the source node, so that service data transmission interruption is avoided.

In a possible implementation, the source node may further store different entries in different areas, to be specific, the source node first identifies the destination address of the data packet carried in the first packet, determines whether the destination address is the address of the service supported by the source node, and then creates the different entries for different first packets in different areas based on the determining result.

The source node identifies destination addresses of data packets in first packets, and classifies the destination addresses into an address of the service supported by the source node and another address, and then separately creates corresponding entries in different areas based on the determining result. This avoids confusion, facilitates different processing on different entries, facilitates management on an important entry, and ensures service data transmission.

In a possible implementation, if the source node needs to create the PMTU entry for the PTB packet, the source node needs to determine whether the source address and the destination address of the data packet carried in the PTB packet are the address pair of the service supported by the source node, and differentiate the PMTU entry based on the address pair.

In a possible implementation, the source node may choose to create different tables, that is, the first table and a second table, where the first table is corresponding to a first area, that is, the first table stores an entry corresponding to an address/address pair of the service supported by the source node; and the second table is corresponding to a second area, that is, the second table stores an entry corresponding to another address/address pair. This avoids confusion, facilitates different processing on different entries subsequently, facilitates management on an important entry, and ensures service data transmission.

In a possible implementation, when the source node creates two tables, the source node needs to create, based on the determining result of whether the destination address of the data packet carried in the first packet is the address of the service supported by the source node, entries corresponding to the first packet in the different areas. If the destination address of the data packet is the address of the service supported by the source node, the source node creates a first entry in the first table. If the destination address of the data packet is not the address of the service supported by the source node, the source node creates a second entry in the second table for the first packet.

To ensure that the entry corresponding to the address of the service supported by the source node is not overwritten, that is, entries of all services may be reserved, the first table needs to have storage space that is large enough and entries that are many enough. For example, a quantity of entries of the first table is not less than a quantity of addresses of services supported by the source node. In this way, the first table stores only the entry corresponding to the address of the service supported by the source node, and there are enough entries. In this way, overwriting is avoided, and the source node can find an entry corresponding to each service of the source node at any time, so that service data transmission interruption is avoided.

In a possible implementation, when the source node creates the PMTU entry for the PTB packet, the source node needs to create the PMTU entry based on the source address and the destination address of the data packet in the PTB packet. Specifically, if the source address and the destination address of the data packet are the address pair of the service supported by the source node, the source node creates a first entry for the PTB packet in the first table. If the source address and the destination address of the data packet are not the address pair of the service supported by the source node, the source node creates a second entry in the second table for the PTB packet, where the first entry and the second entry are the PMTU entries.

In a possible implementation, when the source node creates a neighbor cache entry for the neighbor discovery ND packet, the source node needs to create the first entry and the second entry based on the destination address and the media access control MAC address of the data packet in the neighbor discovery ND packet, where the first entry and the second entry each are the neighbor cache entry.

In a possible implementation, the source node may further create only one table, and perform area division on entries in the same table. There may be a plurality of division manners. Entries of the first area and the second area may be continuously distributed or discontinuously distributed in the same table. Entries corresponding to different first packets are created in different areas, and are stored in the same table for unified management.

In a possible implementation, after the source node divides the same table into the first area and the second area, if in the first packet received by the source node, the destination address of the data packet is the address pair of the supported service, the source node needs to first determine whether a blank entry exists in the first area. If the blank entry exists in the first area, the source node may create the first entry in the blank entry of the first area for the first packet. All entries stored in the first area are entries corresponding to address pairs of services supported by the source node, and it needs to be ensured that an entry in the first area is not deleted or overwritten. Therefore, when the blank entry does not exist in the first area, for example, the entries in the first area are insufficient, if the destination address of the data packet in the first packet is still the address of the supported service, an entry in the second area may be overwritten, and the newly created entry is re-allocated into the first area.

The source node may ensure, according to this implementation, that all the entries in the first area in the table are entries corresponding to addresses of the services supported by the source node. When the entries are insufficient, only an entry of the second area is overwritten, and an entry of the first area is not overwritten. In this way, the source node can find the entry corresponding to each service of the source node at any time, and properly transmit the data packet of the service supported by the source node, so that service data transmission interruption is avoided.

In a possible implementation, when the source node creates the PMTU entry for the PTB packet, the source node needs to create the PMTU entry based on the source address and the destination address of the data packet in the PTB packet. Specifically, if the source address and the destination address of the data packet are the address pair of the service supported by the source node, the source node needs to determine whether a blank entry exists in the first area. If the blank entry exists in the first area, the source node creates a first entry for the PTB packet in the blank entry. If the blank entry does not exist in the first area, the source node needs to create a first entry for the PTB packet in the second area, where the first entry is the PMTU entry.

In a possible implementation, when the source node creates the neighbor cache entry for the neighbor discovery ND packet, the source node needs to create the first entry based on the destination address and the media access control MAC address of the data packet in the neighbor discovery ND packet. Specifically, if the destination address of the data packet is the address of the service supported by the source node, the source node needs to determine whether a blank entry exists in the first area. If the blank entry exists in the first area, the source node creates a first entry for the ND packet in the blank entry. If the blank entry does not exist in the first area, the source node needs to create a first entry for the ND packet in the second area, where the first entry is the neighbor cache entry.

In a possible implementation, when the entries of the first area are full, the source node needs to create an entry for the address of the supported service in the second area. The source node first needs to determine whether a blank entry exists in the second area. If the blank entry exists in the second area, the source node directly occupies the blank entry, creates a first entry for the first packet in the blank entry of the second area, and re-allocates the first entry into the first area. If the blank entry does not exist in the second area, the source node may search for the target entry with the shortest aging time in the second area, and the source node creates a first entry for the address pair of the supported service, and overwrites the target entry.

The source node overwrites the entry with the shortest aging time in the second area, and creates the first entry in the second area for the address of the service supported by the source node. In this way, it can be ensured that an entry in the first area is not overwritten, and entries corresponding to addresses of all services supported by the source node are reserved, thereby avoiding service data transmission interruption.

In a possible implementation, when the destination address of the data packet carried in the first packet received by the source node is not the address of the supported service, the source node still needs to create the second entry for the source node in the second area.

The source node creates an entry in the second area for the first packet whose destination address is not the address of the supported service, to avoid confusion with an entry in the first area and facilitate differentiation.

In a possible implementation, if the first packet received by the source node is the PTB packet, and the source address and the destination address carried in the PTB packet are not the address pair of the service supported by the PTB packet, the source node also needs to create the PMTU entry for the PTB packet. Specifically, the source node creates a second entry in the second area, where the second entry is the PMTU entry.

In a possible implementation, when creating the second entry in the second area, the source node first needs to determine whether a blank entry exists in the second area. If the blank entry exists in the second area, the source node directly occupies the blank entry, and creates the second entry for the first packet in the blank entry of the second area. If the blank entry does not exist in the second area, the source node may search for the target entry with the shortest aging time in the second area, and the source node creates the second entry for the first packet, overwrites the target entry or directly discards the first packet, and does not create the entry for the first packet.

The source node overwrites the entry with the shortest aging time in the second area, and creates a second entry in the second area for another address pair. In this way, it can be ensured that the entry in the second area is updated within time of a periodicity, and new entries are continuously learned, thereby facilitating network interconnection.

In a possible implementation, the aging time is remaining time for deleting the entry. Because a status of a network link changes at any time, entries also needs to be continuously updated and relearned in the time of the periodicity. The aging time is used to indicate the remaining time for deleting the entry. When the aging time is zero, the entry needs to be deleted.

In a possible implementation, overwriting the target entry by the source node may be deleting content of the target entry, and then creating a new entry in a storage location of the target entry.

According to a second aspect, an embodiment of this application provides a network element device for creating a data transmission entry, where the network element device includes:

a receiving unit, configured to receive a first packet sent by a destination node, where content of the first packet includes a destination address of a data packet; and a processing unit, configured to create, depending on whether the destination address of the data packet is an address of a service supported by the network element device, an entry corresponding to the first packet.

In a possible implementation, the first packet is a packet too big PTB packet or a neighbor discovery ND packet.

In a possible implementation, the processing unit is further configured to create a first table, where an entry of the first table has priority information.

The processing unit is specifically configured to: if the destination address of the data packet is the address of the service supported by the network element device, create, by the processing unit, a first priority entry in the first table for the first packet; or if the destination address of the data packet is not the address of the service supported by the network element device, create, by the processing unit, a second priority entry in the first table for the first packet.

In a possible implementation, if the first packet is the packet too big PTB packet, the entry corresponding to the first packet is a path maximum transmission unit PMTU entry, where content of the packet too big PTB packet includes a source address and the destination address of the data packet, and a maximum transmission unit MTU value of the network element device.

The processing unit is specifically configured to: if the source address and the destination address of the data packet are an address pair of the service supported by the network element device, the processing unit creates the first priority entry for the PTB packet; or if the source address and the destination address of the data packet are not an address pair of the service supported by the network element device, create, by the processing unit, the second priority entry for the PTB packet, where the first priority entry and the second priority entry each are the PMTU entry.

In a possible implementation, if the first packet is the neighbor discovery ND packet, the entry corresponding to the first packet is a neighbor cache entry, where content of the neighbor discovery ND packet includes the destination address and a media access control MAC address of the data packet, and the first priority entry and the second priority entry each are the neighbor cache entry.

In a possible implementation, the processing unit is specifically configured to: determine whether a blank entry exists in the first table; and if the blank entry exists in the first table, create, by the processing unit, the first priority entry for the first packet in the blank entry; or if the blank entry does not exist in the first table, determine, by the processing unit, a target entry with shortest aging time in the second priority entry, create the first priority entry for the first packet, and overwrite the target entry.

In a possible implementation, the processing unit is specifically configured to: determine whether a blank entry exists in the first table; and if the blank entry exists in the first table, create, by the processing unit, the second priority entry for the first packet in the blank entry; or if the blank entry does not exist in the first table, determine, by the processing unit, a target entry with shortest aging time in the second priority entry, create the second priority entry for the first packet, and overwrite the target entry.

In a possible implementation, the processing unit is specifically configured to determine whether the destination address of the data packet is the address of the service supported by the network element device; and create the entry corresponding to the first packet in a first area or a second area based on the determining result.

In a possible implementation, if the first packet is the PTB packet, the processing unit is specifically configured to determine whether a source address and the destination address of the data packet are an address pair of the service supported by the network element device, where the PTB packet includes the source address and the destination address of the data packet, and the maximum transmission unit MTU value of the network element device.

In a possible implementation, the processing unit is further configured to create the first table and a second table, where the first table corresponds to the first area, and the second table corresponds to the second area.

In a possible implementation, the processing unit is specifically configured to: if the destination address of the data packet is the address of the service supported by the network element device, create, by the processing unit, a first entry in the first table for the first packet; or if the destination address of the data packet is not the address of the service supported by the network element device, create, by the processing unit, a second entry in the second table for the first packet, where a quantity of entries in the first table is not less than a quantity of addresses of the service supported by the network element device.

In a possible implementation, if the first packet is the packet too big PTB packet, the entry corresponding to the first packet is a path maximum transmission unit PMTU entry, where content of the packet too big PTB packet includes the source address and the destination address of the data packet, and a maximum transmission unit MTU value of a routing device.

The processing unit is specifically configured to: if the source address and the destination address of the data packet are the address pair of the service supported by the network element device, create, by the processing unit, a first entry in the first table for the PTB packet; or if the source address and the destination address of the data packet are not the address pair of the service supported by the network element device, create, by the processing unit, a second entry in the first table for the PTB packet, where the first entry and the second entry each are the PMTU entry.

In a possible implementation, if the first packet is the neighbor discovery ND packet, the entry corresponding to the first packet is a neighbor cache entry, where content of the neighbor discovery ND packet includes the destination address and a media access control MAC address of the data packet, and the first entry and the second entry each are the neighbor cache entry.

In a possible implementation, the first area and the second area are in a same table, and entries of the first area and the second area are continuously distributed in the same table; or entries of the first area and the second area are discontinuously distributed in the same table.

In a possible implementation, the processing unit is specifically configured to: if the destination address of the data packet is the address of the service supported by the network element device, determine, by the processing unit, whether a blank entry exists in the first area; and if the blank entry exists in the first area, create, by the processing unit, a first entry for the first packet in the blank entry; or if the blank entry does not exist in the first area, create, by the processing unit, a first entry for the first packet in the second area.

In a possible implementation, if the first packet is the PTB packet, the entry corresponding to the first packet is a path maximum transmission unit PMTU entry, where content of the packet too big PTB packet includes a source address and the destination address of the data packet, and a maximum transmission unit MTU value of a routing device.

The processing unit is specifically configured to: if the source address and the destination address of the data packet are an address pair of the service supported by the network element device, determine, by the processing unit, whether the blank entry exists in the first area; and if the blank entry exists in the first area, create, by the processing unit, a first entry for the PTB packet in the blank entry; or if the blank entry does not exist in the first area, create, by the processing unit, a first entry for the PTB packet in the second area, where the first entry is the PMTU entry.

In a possible implementation, if the first packet is the neighbor discovery ND packet, the entry corresponding to the first packet is a neighbor cache entry, where content of the neighbor discovery ND packet includes the destination address and a media access control MAC address of the data packet, and the first entry is the neighbor cache entry.

In a possible implementation, the processing unit is specifically configured to: determine whether a blank entry exists in the second area; and if the blank entry exists in the second area, create, by the processing unit, the first entry for the first packet in the blank entry of the second area; or if the blank entry does not exist in the second area, determine, by the processing unit, a target entry with shortest aging time in the second area; and create, by the processing unit, the first entry for the first packet and overwrite the target entry.

In a possible implementation, the processing unit is further configured to: if the destination address of the data packet is not the address of the service supported by the network element device, create, by the processing unit, a second entry in the second area for the first packet.

In a possible implementation, if the first packet is the PTB packet, the entry corresponding to the first packet is a path maximum transmission unit PMTU entry, where content of the packet too big PTB packet includes a source address and the destination address of the data packet, and a maximum transmission unit MTU value of a routing device.

The processing unit is specifically configured to: if the source address and the destination address of the data packet are not an address pair of the service supported by the network element device, create, by the processing unit, a second entry for the PTB packet in the second area, where the second entry is the PMTU entry.

In a possible implementation, the processing unit is specifically configured to: determine whether a blank entry exists in the second area; and if the blank entry exists in the second area, create, by the processing unit, the second entry for the first packet in the blank entry of the second area; or if the blank entry does not exist in the second area, determine, by the processing unit, a target entry with shortest aging time in the second area; and create, by the processing unit, the second entry for the first packet and overwrite the target entry; or if the blank entry does not exist in the second area, discard the first packet.

In a possible implementation, the aging time is remaining time for deleting the entry.

In a possible implementation, the processing unit is specifically configured to: delete content of the target entry; and create an entry in the target entry for the first packet.

A third aspect of this application provides a communication device, including at least one processor and a memory, where the memory stores computer-executable instructions that can be run on the processor, and when the computer-executable instructions are executed by the processor, the network element device performs the method according to any one of the first aspects or the possible implementations of the first aspect.

A fourth aspect of this application provides a communication apparatus, including at least one processor and an interface circuit, where the interface circuit is configured to: receive a signal from another communication apparatus other than the communication apparatus and transmit the signal to the processor, or send a signal from the processor to another communication apparatus other than the communication apparatus, and the processor is configured to implement the method according to any one of the first aspect or the possible implementations of the first aspect by using a logic circuit or executing code instructions.

A fifth aspect of embodiments of this application provides a computer storage medium, where the computer storage medium is configured to store computer software instructions used by the foregoing network element device, and the computer software instructions include a program designed for executing the network element device.

The network element device may be the network element device described in the second aspect.

A sixth aspect of this application provides a chip or a chip system, and the chip or the chip system includes at least one processor and an interface circuit, where the interface circuit and the at least one processor are interconnected by using a line, and the at least one processor is configured to run a computer program or instructions, to perform the method for creating a PMTU entry according to any one of the first aspect to the possible implementations of the first aspect.

The interface circuit in the chip may be an input/output interface, a pin, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) outside the chip.

A seventh aspect of embodiments of this application provides a computer program product, and the computer program product includes computer software instructions, where the computer software instructions may be loaded by a processor to implement a procedure in the method for creating a data transmission entry according to any one of the implementations of the first aspect.

It can be learned from the foregoing technical solutions that embodiments of this application have the following advantages.

In embodiments of the present invention, after receiving the first packet, the source node first determines whether the destination address of the data packet carried in the first packet is the address of the service supported by the source node, to determine whether the data packet is a data packet sent by the service of the source node, and then determines a corresponding position to create an entry. In this way, the entry of the service of the source node may be distinguished from an entry of another service, so that the entry of the service of the source node is created in a specific position, to ensure that the source node can obtain the entry corresponding to the service of the source node and accurately process the packet of the service, and ensure normal data transmission of the service of the source node.

DESCRIPTION OF EMBODIMENTS

Embodiments of this application provide a method for creating a data transmission entry and a related device, to prevent a data transmission entry corresponding to an important service of a network element device from being overwritten.

Figure 1:
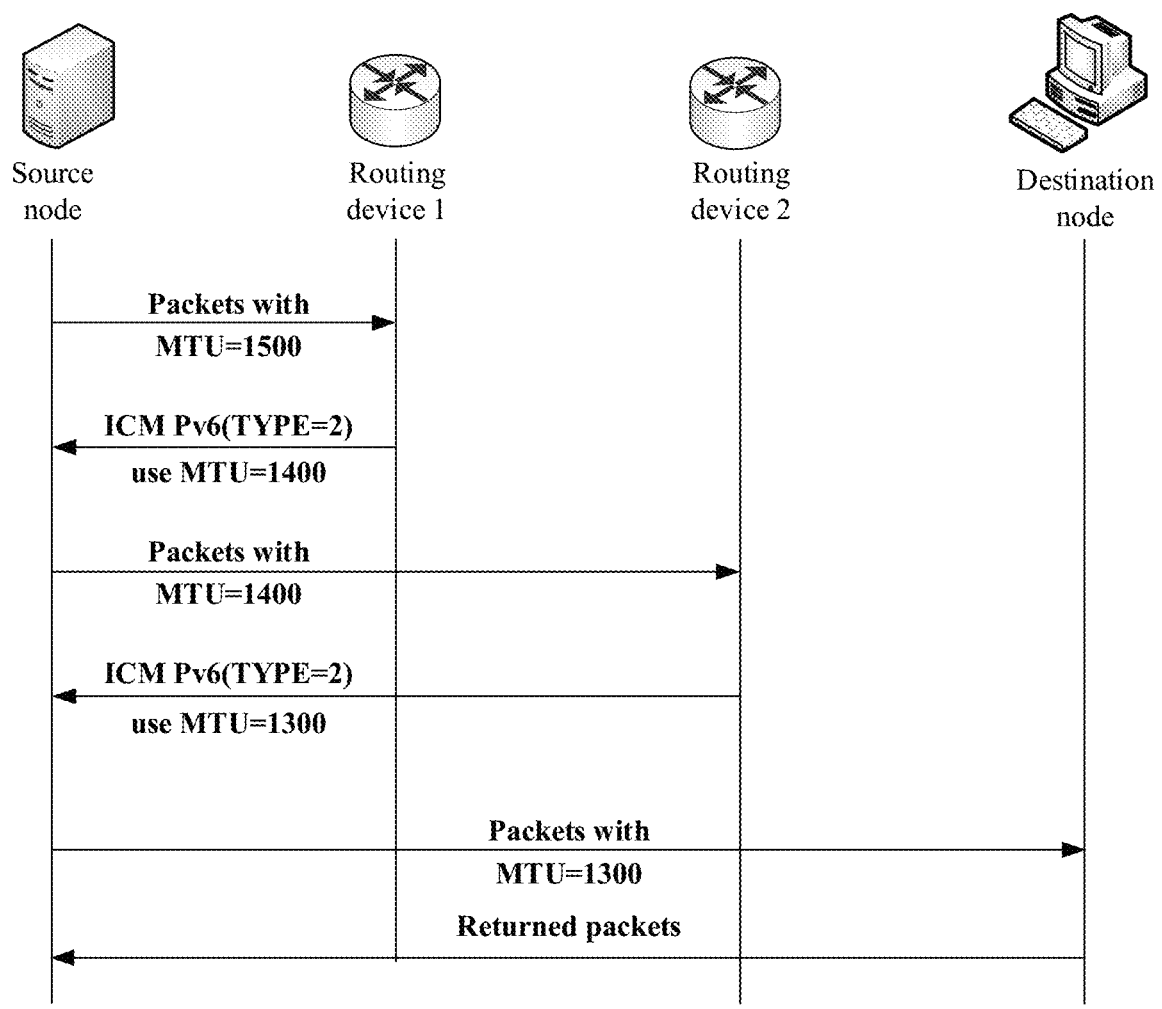
FIG. 1 is a schematic diagram of a network architecture for constructing a PMTU entry by a source node according to this application.

FIG. 1 is a schematic diagram of a network architecture for constructing a PMTU entry by a source node according to this application. As shown in FIG. 1, a data transmission link of the source node is connected to a destination node through a routing device 1 and a routing device 2. When sending a data packet to the destination node, the source node first sends a data packet whose maximum transmission unit MTU value is 1500. It is assumed that an MTU value of the routing device 1 is 1400, and an MTU value of the routing device 2 is 1300. When the data packet is transmitted to the routing device 1, because a length of the data packet exceeds a maximum transmission length of the routing device 1, the routing device 1 discards the data packet, and sends a PTB packet to the source node. The PTB packet is used to indicate that the original data packet is discarded because the length of the original data packet exceeds the maximum transmission unit MTU value of the routing device, and the MTU value of the routing device 1 is sent to the source node. After receiving the PTB packet sent by the routing device 1, the source node may fragment the data packet on the link based on a newly learned PMTU and the MTU value of the routing device 1, for example, change the length of the data packet to 1400 (the MTU value of the routing device 1). A resent data packet may be successfully forwarded by the routing device 1. When the data packet is transmitted to the routing device 2, because the MTU value of the routing device 2 is 1300, and a length of the data packet sent for the second time exceeds the MTU value of the routing device 2. In this case, the routing device 2 still discards the data packet and sends the PTB packet to the source node, to notify that a maximum transmission unit of the routing device 2 is 1300.

After receiving the PTB packet sent by the routing device 2, the source node may re-fragment the data packet on the link, for example, change the length of the data packet to 1300 (the MTU value of the routing device 2). In this way, learning is performed in sequence. The source node obtains a path maximum transmission unit PMTU of the link based on a last fragmentation status of the data packet, and creates an entry in a PMTU table for the link. When subsequently transmitting data by using the link, the source node may search for a PMTU value of the link in the entry, to properly determine the length of the data packet.

For example, the source node may create a PMTU table to store a PMTU entry. The PMTU table may generally include a source address, a destination address, a PMTU value, aging time, and the like. Details are shown in the following Table 1.

TABLE 1

| Source IPv6 address | Destination IPv6 address | MTU value | Aging Time (minute) |
|---|---|---|---|
| 2000::1000 | 3000::1000 | 1800 | 8 |
| 3010::1001 | 3012::4000 | 2000 | 10 |
| . . . | . . . | . . . | . . . |

The source IPv6 address and the destination IPv6 address are respectively an IPv6 address of the source node and an IPv6 address of the destination node, and the address pair is used to determine a fixed data transmission link. The MTU value in the entry is continuously updated before the source node receives a feedback message indicating that the packet is successfully transmitted. Provided that the source node receives a PTB packet sent by an intermediate router, the source node updates the MTU value in the entry based on an MTU value of a routing device carried in the PTB packet. It may be understood that, after the data packet on the link is successfully sent, the MTU value in the entry is the PMTU value of the link, that is, a PMTU value of a link may actually be a smallest value of MTU values of all routing devices on the link.

The aging time may be time for deleting one PMTU entry. It may be understood that the PMTU table may further include other information. Only some core information is described herein, and a specific form is not limited.

Figure 2:
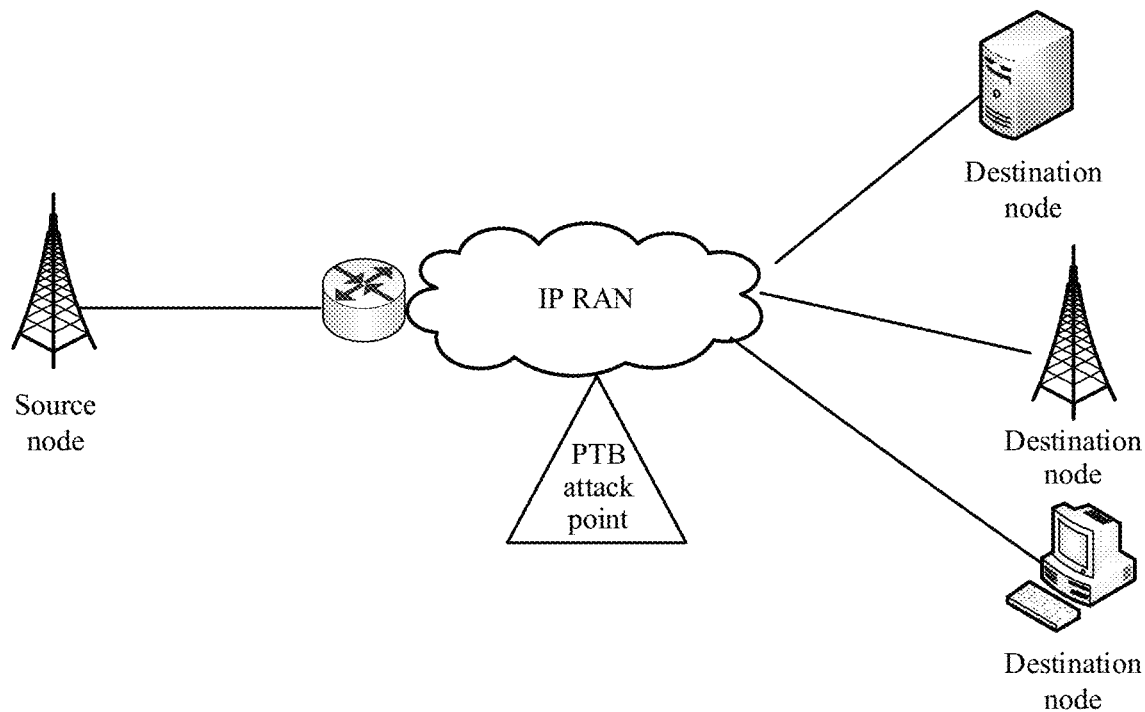
FIG. 2 is a schematic diagram of a network in which a source node suffers a PTB packet flood attack according to this application.

In a non-security scenario, the source node suffers a PTB packet flood attack. FIG. 2 is a schematic diagram of a network in which a source node suffers a PTB packet flood attack according to this application. A base station is connected to each destination node. A RAN device is mainly responsible for functions such as radio resource management, quality of service (QoS) management, and data compression and encryption on an air interface side. In this scenario, an attack point of the PTB packet may be a routing device in the RAN device, or may be an application program. For example, an attacked routing device sends a large quantity of PTB packets to the source node. When creating a PMTU entry, the source node not only needs to create a PMTU entry of a data link corresponding to a service of the source node, but also needs to create a PMTU entry from the source node to another routing device to facilitate network interconnection. However, the source node can identify a destination IPv6 address of the service of the source node, but cannot identify an address of a routing device in a network. Therefore, the source node cannot identify whether a received PTB packet is an attack packet, and therefore creates PMTU entries for all received PTB packets. In this way, because storage space of the PMTU table is limited, when a large quantity of the PTB packets flood in, the source node creates a large quantity of new PMTU entries and overwrites a PMTU entries corresponding to a normal PTB packet. As a result, the source node cannot find a PMTU value of a link corresponding to an important service, that is, the source node cannot fragment the data packet, and consequently data transmission is interrupted.

Figure 3:
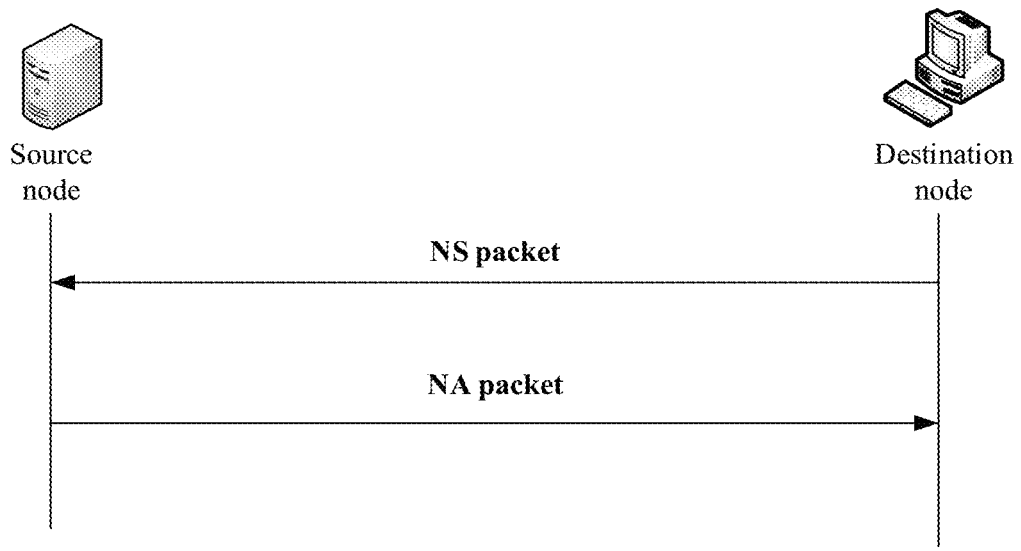
FIG. 3 is a schematic diagram of a network architecture for constructing an ND entry by a source node according to this application.

FIG. 3 is a schematic diagram of a network architecture for constructing an ND entry by a source node according to this application. An ND protocol is an important protocol in IPv6, and integrates and improves protocols such as the ARP protocol for address resolution and the ICMP protocol for packet control that are in IPv4. Specifically, functions provided by the ND protocol include: address resolution, stateless address autoconfiguration, route redirection, and the like. The address resolution function is used to determine a MAC address of a target node, to implement interworking between a layer 3 network and a layer 2 network.

As shown in FIG. 3, the ND protocol resolves an IPv6 address into a MAC address through NS and NA packet exchange between nodes and creates neighbor cache entries by using information obtained through resolution, such as the MAC address and the IPv6 address. For example, a destination node sends one NS packet to the source node, where the NS packet carries an IPv6 address and a MAC address of the destination node and a multicast address corresponding to the source node. After receiving the NS packet, the source node may process the NS packet based on a multicast address carried in the NS packet. The source node may first determine whether the multicast address is the multicast address corresponding to the source node, and if the multicast address is the multicast address corresponding to the source node, the source node updates a neighbor cache list of the source node based on the IPv6 address and the MAC address of the destination node that are carried in the NS packet.

According to the ND protocol, when receiving the NS packet, the source node needs to feed back each NS packet, that is, the source node needs to send an NA packet to the destination node that sends the NS packet, where the packet carries the IPv6 address and the MAC address of the source node. After receiving the NA packet, the destination node updates the neighbor cache list of the destination node based on information in the NA packet. In this way, the source node and the destination node learn of the MAC address of each other, to communicate with each other. The neighbor cache entries may include the destination IPv6 address, the MAC address, a status, aging time, and the like. For example, the entries are shown in Table 2.

TABLE 2

| Destination IPv6 address | MAC address | Status | Aging Time (minute) |
|---|---|---|---|
| 2000::1000 | XX::XX::XX::XX | Reachable | 8 |
| 3010::1001 | XX::XX::XX::XX | Reachable | 10 |
| . . . | . . . | . . . | . . . |

As specified in the ND protocol, after receiving the NS packet, the source node needs to provide a feedback packet NA packet of the NS packet to the destination node. Therefore, the source node needs to update the neighbor cache entries based on each received NS packet. However, the source node may suffer an NS packet flood attack, and the source node needs to create an entry corresponding to each NS packet based on each NS packet. In this way, because storage space of the neighbor cache entries is limited, when a large quantity of NS packets flood into the source node, the source node creates a large quantity of new entries and overwrites an entry corresponding to a normal NS packet. As a result, the source node cannot find a MAC address of a link corresponding to an important service, and data transmission is interrupted.

In an embodiment of a method for creating a data transmission entry provided in embodiments of this application, the source node may create a table with priority information based on a received first packet. If the first packet is a PTB packet, a form of the table may be shown in Table 3. If the first packet is an NS packet, a form of the table may be shown in Table 4.

TABLE 3

| Source IPv6 address | Destination IPv6 address | MTU value | Aging Time (minute) | Priority |
|---|---|---|---|---|
| 2000::1000 | 3000::1000 | 1800 | 8 | High |
| 3000::1001 | 2001::1020 | 2000 | 10 | High |
| 2032::2011 | 2645::3002 | 1500 | 3 | Low |
| 3001::1300 | 3012::4000 | 1800 | 6 | High |
| 4010::2001 | 2333::1123 | 1500 | 7 | Low |
| . . . | . . . | . . . | . . . | . . . |

TABLE 4

| Destination IPv6 address | MAC address | Status | Aging Time (minute) | Priority |
|---|---|---|---|---|
| 2000::1000 | XX::XX::XX::XX | Reachable | 8 | High |
| 3000::1001 | XX::XX::XX::XX | Reachable | 10 | High |
| 2032::2011 | XX::XX::XX::XX | Reachable | 3 | Low |
| 3001::1300 | XX::XX::XX::XX | Reachable | 6 | High |
| 4010::2001 | 0:0:0:0:0:0 | Not reachable | 7 | Low |
| ... | ... | ... | ... | ... |

Figure 4:
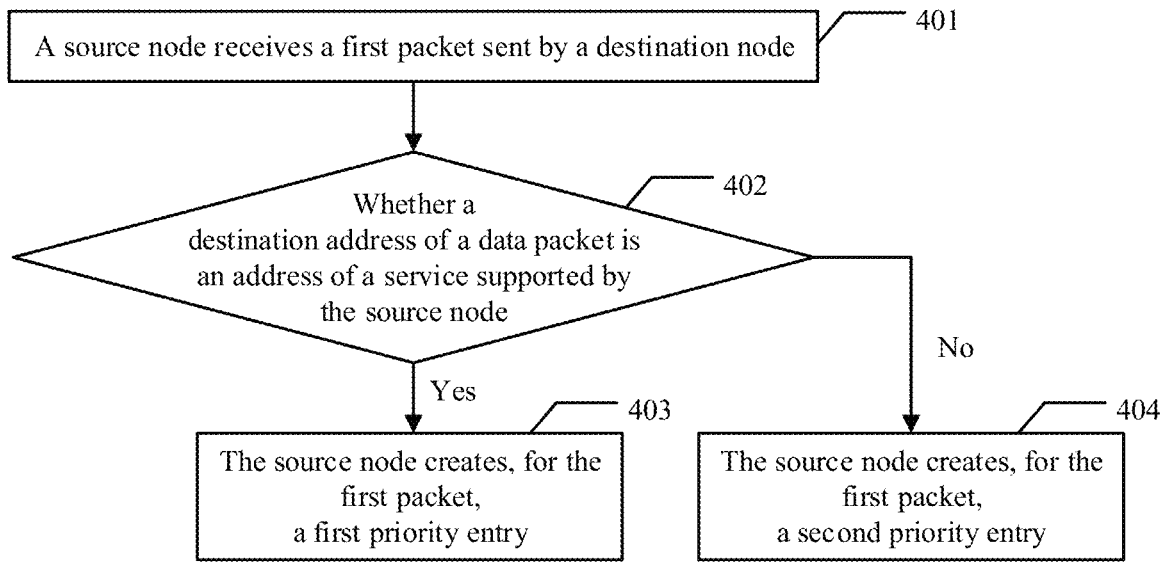
FIG. 4 is a schematic diagram of an embodiment of a method for creating a data transmission entry according to an embodiment of this application.

FIG. 4 is a schematic diagram of an embodiment of a method for creating a data transmission entry according to an embodiment of this application. As shown in FIG. 4, in a first embodiment provided in embodiments of this application, when a blank entry exists in a first table, that is, the first table is not full, the method includes the following steps.

401: A source node receives a first packet sent by a destination node.

For example, when the first packet is a PTB packet, the source node needs to first send a data packet to the destination node. When a length of the data packet exceeds a maximum transmission unit MTU value of a routing device on a link, the routing device discards the data packet, and sends one PTB packet to the source node. The PTB packet is used to indicate that the length of the data packet is excessively large, and indicate the source node to regroup the data packet. Generally, content of the PTB packet may include a source address and a destination address of an original data packet, which are used to notify the source node of a link on which the data packet is deleted, and at the same time, the MTU value of the routing device is further sent. The source node may re-fragment the data packet on the link based on the MTU value, so that the data packet is successfully forwarded by the routing device.

For example, when the first packet is an NS packet sent by the destination node, the NS packet is used to request a MAC address of the source node, and carries an IPv6 address and a MAC address of the destination node. Because the source node needs to feed back a received NS packet, that is, send an NA packet to the destination node, the source node needs to learn a correspondence between the IPv6 address and the MAC address of the destination node from the NS packet, to complete communication between the source node and the destination node.

402: The source node determines whether the source address of the data packet is an address of a service supported by the source node; and if the data packet is the address of the service supported by the source node, step 403 is performed; or if the data packet is not the address of the service supported by the source node, step 404 is performed.

After receiving the PTB packet, the source node may determine, based on the source address and the destination address of the original data packet carried in the PTB packet, a link on which the data packet is discarded. In this way, when the data packet needs to be sent on the link again, fragmentation may be performed based on the MTU value of the routing device in the PTB packet.

For example, the source address and the destination address corresponding to the service of the source node may be preconfigured by a user, or may be learned based on signaling. After the PTB packet carries the source address and the destination address of the original data packet, the source node may match a fixed link, and learn that the data packet is provided by the service supported by the source node. Because the source node needs to ensure normal running of the service supported by the source node, the source node needs to query for a PMTU value of the link, properly fragment the data packet of the service supported by the source node, and ensure normal data transmission.

The source node further needs to create a PMTU entry with another routing device, to ensure that the source node can communicate with the another routing device. In this case, the source node cannot identify an address of the routing device, and can only passively learn an MTU value of the routing device to create a PMTU entry between the source node and the routing device.

Storage space for the source node to create a PMTU table is limited. When the source node suffers a PTB packet flood attack, the source node passively receives a large quantity of PTB packets because the source node cannot identify an address of a routing device. In this case, the source node may create a large quantity of useless entries, and a PMTU entry corresponding to the service of the source node may also be overwritten by these useless entries. As a result, the data packet of the service supported by the source node cannot be normally transmitted, and the service supported by the source node is interrupted.

Therefore, a PTB packet that carries an address pair of the service supported by the source node needs to be selected and specially stored. Generally, the service supported by the source node may include service links such as internet key exchange (IKE), a management plane function MP, a control plane function CP, and a user plane function UP. This is not specifically limited.

After receiving the NS packet, the source node may determine, based on the destination address of the original data packet carried in the NS packet, whether the NS packet is sent by the destination node of the service supported by the source node. To maintain service communication between the source node and a peer end of the supported service, the source node needs to learn of a MAC address of the peer end of the supported service. Because storage space for the source node to create a neighbor cache entry is limited, when suffering an NS packet flood attack, the source node needs to reply with an NA packet for each NS packet, and therefore passively receives a large quantity of NS packets and creates a large quantity of useless entries. An ND entry corresponding to the service of the source node may also be overwritten by these useless entries. As a result, the data packet of the service supported by the source node cannot be normally transmitted, and the service supported by the source node is interrupted.

Therefore, an NS packet that carries a destination address of the service supported by the source node needs to be selected and specially stored. Generally, the service supported by the source node may include service links such as internet key exchange (IKE) at a same network segment, a management plane function, a control plane function, and a user plane function. This is not specifically limited.

403: The source node creates a first priority entry for the first packet.

When the source node identifies, based on the source address and the destination address of the data packet carried in the PTB packet, that the address pair is an address pair of the service supported by the source node, it indicates that the data packet is a data packet sent by the service of the source node. In this way, to ensure normal running of the service of the source node, a high priority PMTU entry needs to be created to ensure normal data transmission. Optionally, as shown in Table 3, one piece of priority information is added to the PMTU table, and the PMTU entry corresponding to the service of the source node is defined as the high priority PMTU entry.

When the source node identifies, based on the destination address of the data packet carried in the NS packet, that the address is an address of the service supported by the source node, it indicates that the data packet is a data packet sent by the service of the source node. In this way, to ensure normal running of the service of the source node, a high priority ND entry needs to be created, and a correspondence between a destination address and a MAC address in the NS packet needs to be learned, to ensure normal data transmission.

404: The source node creates a second priority entry for the first packet.

If the source address and the destination address of the data packet carried in the PTB packet are not the address pair of the service supported by the source node, a low priority PMTU entry needs to be created.

If the destination address of the data packet carried in the NS packet is not the address of the service supported by the source node, a low priority ND entry needs to be created.

In the technical solution provided in this embodiment, the source node sifts out, based on the destination address of the data packet carried in the first packet, the first packet corresponding to the data packet of the service of the source node, and creates a high priority entry in the first table. In this way, entries are distinguished between, to facilitate management of the entry corresponding to the service of the source node.

Figure 5:
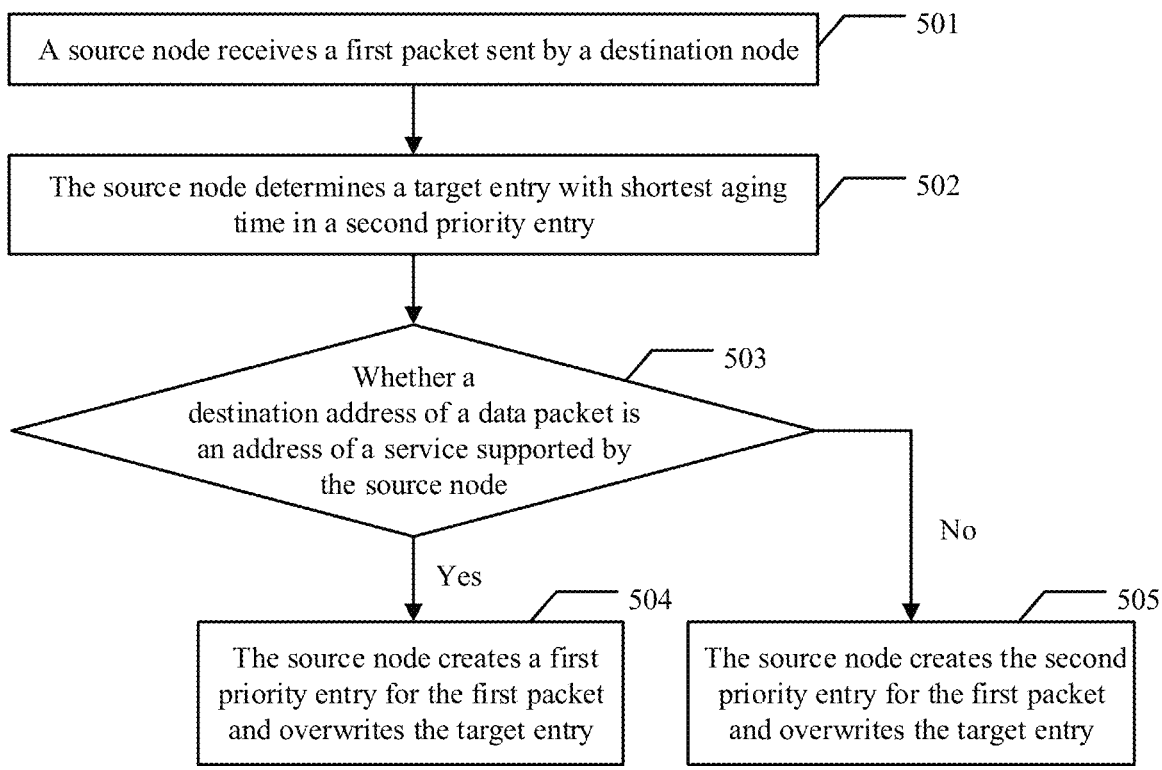
FIG. 5 is a schematic diagram of an embodiment of a method for creating a data transmission entry according to an embodiment of this application.

FIG. 5 is a schematic diagram of another embodiment of a method for creating a data transmission entry according to an embodiment of this application. As shown in FIG. 5, in a second embodiment provided in embodiments of this application, when a blank entry does not exist in a first table, that is, the first table is full, the method includes the following steps.

501: A source node receives a first packet sent by a routing device.

Step 501 is similar to step 401 in the embodiment shown in FIG. 4, and details are not described herein again.

502: The source node determines a target entry with shortest aging time in a second priority entry.

The aging time may be time for deleting an entry. Because a status of a network link may dynamically change, the entry needs to be updated within time of a periodicity. For example, when aging time of an entry is 0, the entry may be deleted.

Optionally, the source node may use an entry with shortest aging time in a second priority as the target entry to be overwritten.

503: The source node determines whether a destination address of a data packet is an address of a service supported by the source node; and if the destination address of the data packet is the address of the service supported by the source node, step 504 is performed; or if the destination address of the data packet is not the address of the service supported by the source node, step 505 is performed.

Step 503 is similar to step 402 in the embodiment shown in FIG. 4, and details are not described herein again.

504: The source node creates a first priority entry for the first packet and overwrites the target entry.

505: The source node creates the second priority entry for the first packet and overwrites the target entry.

Optionally, overwriting the target entry may be deleting content in an original entry to obtain a blank entry, and then creating a new entry in the blank entry.

In step 504 and step 505, the source node creates entries of different priorities based on different determining results to overwrite the target entry. If the destination address of the data packet is the address of the service supported by the source node, a high priority entry may be created to overwrite a low priority entry. In this way, when an entry is created again, the first priority entry is not overwritten. If the destination address of the data packet is not the address of the service supported by the source node, a low priority entry may be created to overwrite an old low priority entry, and the newly created low priority entry may still be overwritten.

In the technical solution provided in this embodiment, after the first table is full, only the low priority entry is allowed to be overwritten, and the high priority entry is not allowed to be overwritten. In this way, it can be ensured that an entry corresponding to the service of the source node can be normally updated, and is not attacked by the low priority entry, so that normal transmission of service data of the source node is ensured.

In another embodiment of a method for creating a data transmission entry provided in embodiments of this application, the source node may respectively store different entries in two different areas. Specifically, the source node may determine whether the destination address of the data packet carried in the first packet is the address of the service supported by the source node, and then choose, based on a determining result, to create the entry corresponding to the first packet in a first area or a second area.

(1) The Source Node Creates Two Tables.

Figure 6:
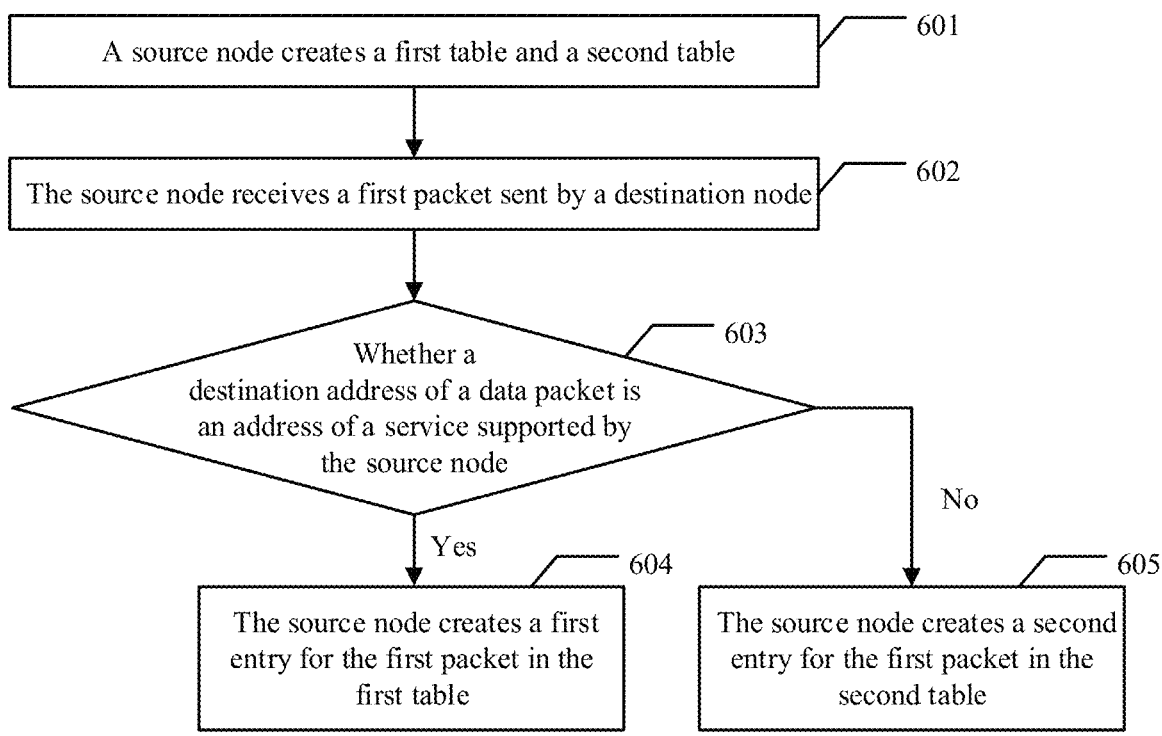
FIG. 6 is a schematic diagram of an embodiment of a method for creating a data transmission entry according to an embodiment of this application.

FIG. 6 is a schematic diagram of another embodiment of a method for creating a data transmission entry according to an embodiment of this application. As shown in FIG. 6, in a third embodiment provided in embodiments of this application, the method includes the following steps.

601: The source node creates a first table and a second table.

It may be understood that the source node may choose to create two tables to allocate and store different entries, where the first table corresponds to the first area, and the second table corresponds to the second area.

602: The source node receives a first packet sent by a destination node.

Step 602 is similar to step 401 in the embodiment shown in FIG. 4, and details are not described herein again.

603: The source node determines whether a destination address of a data packet is an address of a service supported by the source node; and if the destination address of the data packet is the address of the service supported by the source node, step 604 is performed; or if the destination address of the data packet is not the address of the service supported by the source node, step 605 is performed.

Step 603 is similar to step 402 in the embodiment shown in FIG. 4, and details are not described herein again.

604: The source node creates a first entry for the first packet in the first table.

It may be understood that, the source node selects different tables for different first packets to create entries depending on whether the destination address of the data packet is the address of the service supported by the source node. The source node may select the first table to create an entry for the service of the source node. For example, there are enough entries in the first table, so that the source node creates entries for all services of the source node. Optionally, a quantity of entries in the first area is not less than a quantity of destination addresses of services supported by the source node.

605: The source node creates a second entry for the first packet in the second table.

In the technical solution provided in this embodiment, the entry corresponding to the service of the source node is separately stored, to prevent another entry from overwriting the entry, ensure that the entry corresponding to the service of the source node can be normally updated and is not attacked by another entry, and ensure normal transmission of service data of the source node.

(2) The Source Node Creates One Table.

The source node may alternatively choose to create one table to facilitate unified management, to be specific, one table may be divided into two areas. Entries in the two areas may be continuously distributed in the same table, or may be discretely and discontinuously distributed in the same table. A specific form is not limited. When the entries in the first area and the second area are continuously distributed, a form of the table may be shown in Table 5 or Table 6.

TABLE 5

| Source IPv6 address | Destination IPv6 address | MTU value | Aging Time (minute) |
|---|---|---|---|
| 2000::1000 | 3000::1000 | 1800 | 8 |
| 3000::1001 | 2001::1020 | 2000 | 10 |
| ... | ... | ... | ... |
| 2032::2011 | 2645::3002 | 1500 | 3 |
| 3001::1300 | 3012::4000 | 1800 | 6 |
| ... | ... | ... | ... |

TABLE 6

| Destination IPv6 address | MAC address | Status | Aging Time (minute) |
|---|---|---|---|
| 2000::1000 | XX:XX:XX:XX | Reachable | 8 |
| 3000::1001 | XX:XX:XX:XX | Reachable | 10 |
| ... | ... | ... | ... |
| 2032::2011 | XX:XX:XX:XX | Reachable | 3 |
| 3001::1300 | XX:XX:XX:XX | Reachable | 6 |
| ... | ... | ... | ... |

For example, an upper part is the first area, used to store the entry corresponding to the address of the service supported by the source node, and a lower part is the second area, used to store another entry.

After creating the table, the source node determines whether the destination address of the data packet in the received first packet is the address of the service supported by the source node, and then selects an area based on a determining result.

Figure 7:
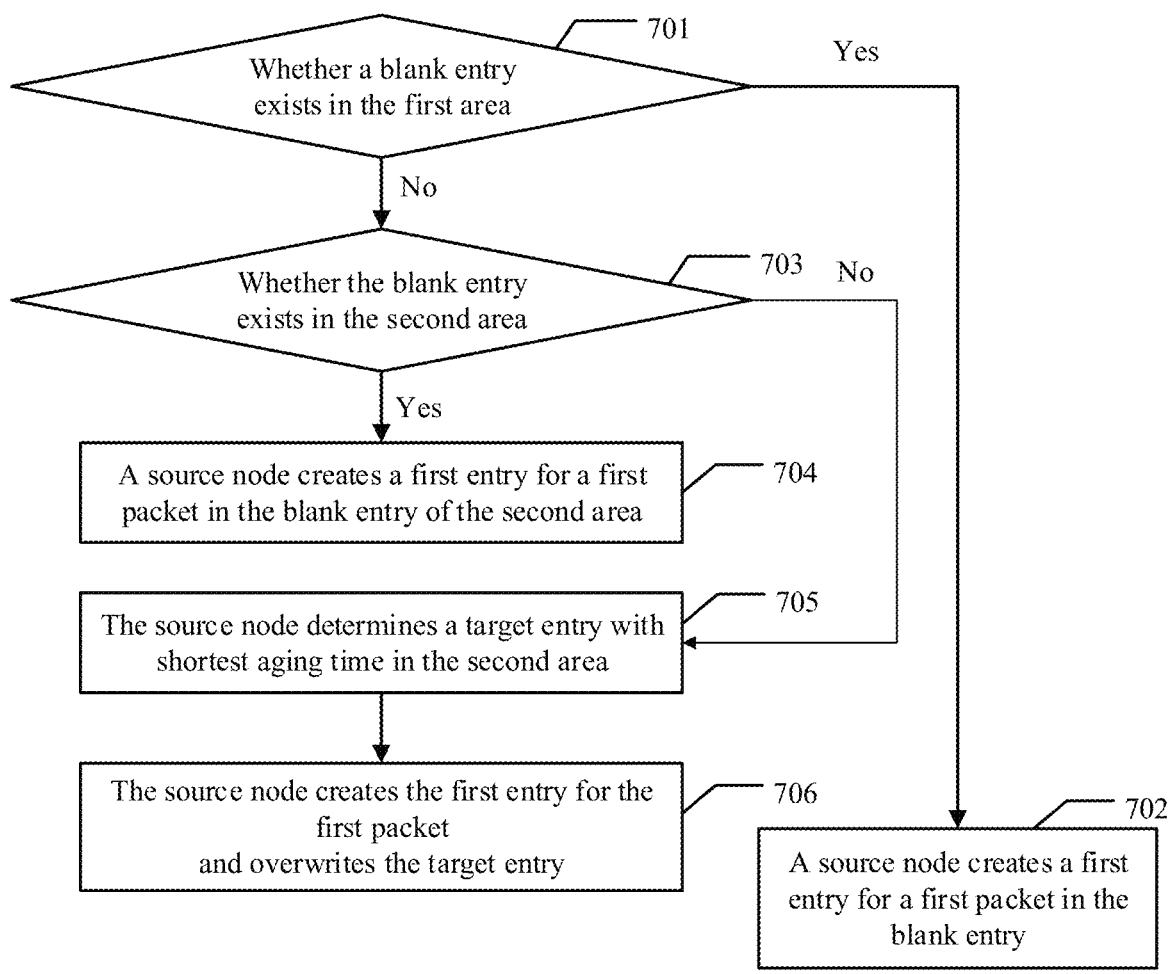
FIG. 7 is a schematic diagram of an embodiment of a method for creating a data transmission entry according to an embodiment of this application.

FIG. 7 is a schematic diagram of another embodiment of a method for creating a data transmission entry according to an embodiment of this application. As shown in FIG. 7, in a fourth embodiment provided in embodiments of this application, if a destination address of a data packet in a first packet received by a source node is an address of a service supported by the source node, the method includes the following steps.

701: The source node determines whether a blank entry exists in a first area; and if the blank entry exists in the first area, step 702 is performed, or if the blank entry does not exist in the first area, step 703 is performed.

702: The source node creates a first entry for the first packet in the blank entry.

703: The source node determines whether a blank entry exists in a second area; and if the blank entry exists in the second area, step 704 is performed, or if the blank entry does not exist in the second area, step 705 is performed.

If the blank entry does not exist in the first area, for example, the first area is completely occupied, because an entry corresponding to the service of the source node needs to be created and an entry of another service of the source node cannot be overwritten, the source node should choose to occupy an entry in the second area. To occupy the entry in the second area, the source node also needs to filter entries in the second area. A preferred solution is that the blank entry in the second area should be first occupied.

704: The source node creates the first entry for the first packet in the blank entry of the second area.

If the blank entry exists in the second area, an entry of the service supported by the source node may be directly created in the blank entry. It may be understood that the newly created entry may be re-allocated into the first area.

705: The source node determines a target entry with shortest aging time in the second area.

706: The source node creates a first PMTU entry for the first packet and overwrites the target entry.

After the source node overwrites a second entry with shortest aging time in the second area, optionally, the newly created entry may be allocated into the first area.

In the technical solution provided in this embodiment, after the first area of the table is full, only an entry of the second area is allowed to be overwritten, and an entry of the first area is not allowed to be overwritten. In this way, it can be ensured that the entry corresponding to the service of the source node can be normally updated, and is not attacked by a low priority entry, so that normal transmission of service data of the source node is ensured.

Figure 8:
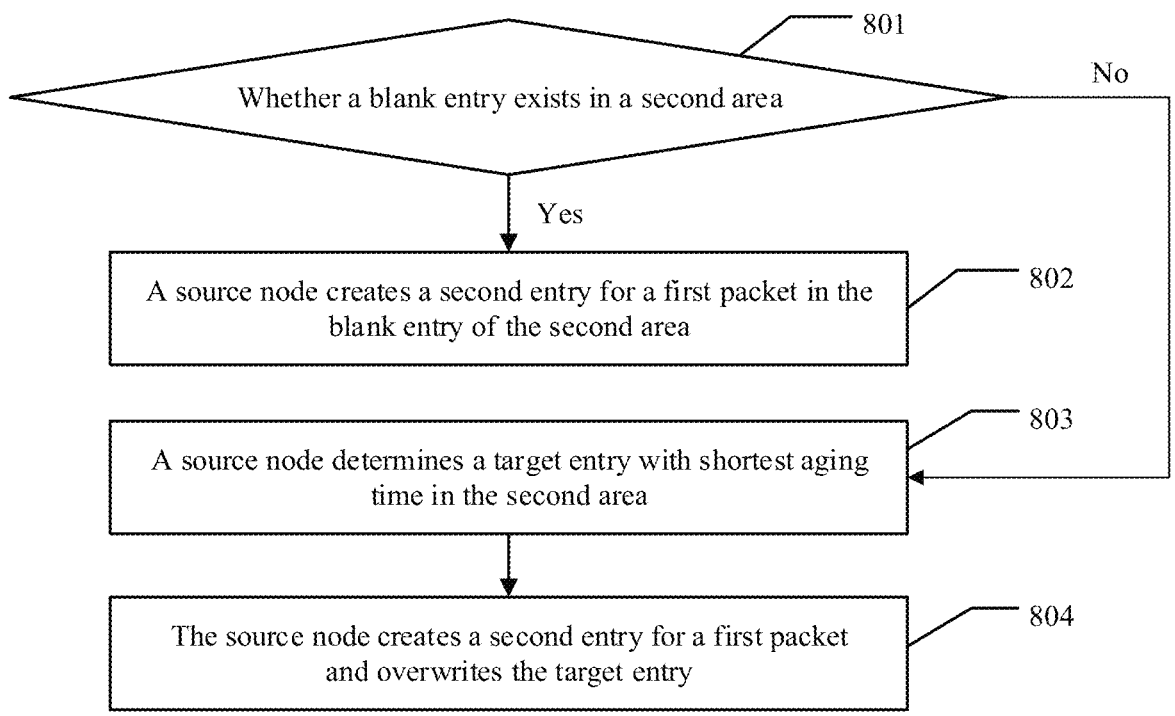
FIG. 8 is a schematic diagram of an embodiment of a method for creating a data transmission entry according to an embodiment of this application.

FIG. 8 is a schematic diagram of another embodiment of a method for creating a data transmission entry according to an embodiment of this application. As shown in FIG. 8, in a fifth embodiment provided in embodiments of this application, if a destination address of a data packet in a first packet received by a source node is not an address of a service supported by the source node, the method includes the following steps.

801: The source node determines whether a blank entry exists in a second area; and if the blank entry exists in the second area, step 802 is performed; or if the blank entry does not exist in the second area, step 803 is performed.

Step 801 is similar to step 703 in the embodiment shown in FIG. 7, and details are not described herein again.

802: The source node creates a second entry for the first packet in the blank entry of the second area.

When the destination address of the data packet carried in the first packet is not the address of the service supported by the source node, the source node allows the second entry to be created only in the second area. When the blank entry exists in the second area, the second entry may be directly created in the blank entry.

803: The source node determines a target entry with shortest aging time in the second area.

804: The source node creates the second entry for the first packet and overwrites the target entry.

In an optional embodiment, after the second area is fully occupied, the source node may alternatively choose not to create an entry, and directly discard a PTB packet.

In the technical solution provided in this embodiment, when creating the second entry, the source node allows the second entry to be created only in the second area, and does not allow an entry in a first area to be overwritten. In this way, it can be ensured that the entry corresponding to the service of the source node can be normally updated and is not attacked by a low priority entry, so that normal transmission of service data of the source node is ensured.

Figure 9:
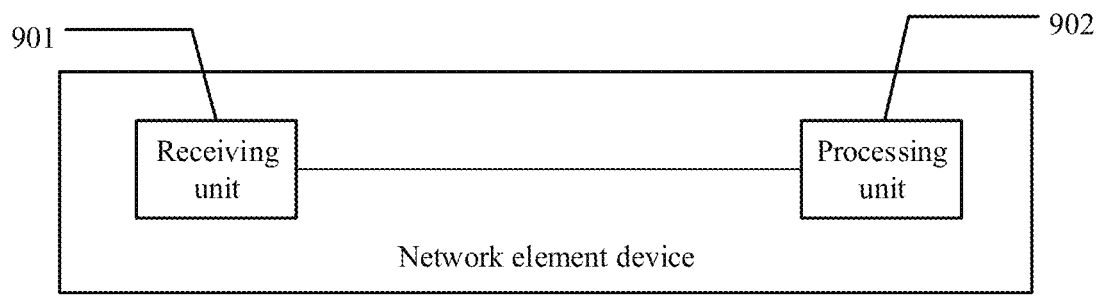
FIG. 9 is a schematic diagram of an embodiment of a network element device according to an embodiment of this application.

Refer to FIG. 9. An embodiment of this application provides a schematic diagram of an embodiment of a network element device for creating a data transmission entry. As shown in FIG. 9, this embodiment of this application provides an embodiment of a network element device, including:

a receiving unit 901, configured to receive a first packet sent by a destination node, where content of the first packet includes a destination address of a data packet; and a processing unit 902, configured to create, depending on whether the destination address of the data packet is an address of a service supported by the network element device, an entry corresponding to the first packet.

In an optional implementation, the first packet is a packet too big PTB packet or a neighbor discovery ND packet.

In an optional implementation, the processing unit 902 is further configured to create a first table, where an entry of the first table has priority information; and the processing unit 902 is specifically configured to: if the destination address of the data packet is the address of the service supported by the network element device, create, by the processing unit 902, a first priority entry in the first table for the first packet; or if the destination address of the data packet is not the address of the service supported by the network element device, create, by the processing unit 902, a second priority entry in the first table for the first packet.

In an optional implementation, if the first packet is the packet too big PTB packet, the entry corresponding to the first packet is a path maximum transmission unit PMTU entry, where content of the packet too big PTB packet includes a source address and the destination address of the data packet, and a maximum transmission unit MTU value of the network element device.

The processing unit 902 is specifically configured to: if the source address and the destination address of the data packet are an address pair of the service supported by the network element device, create, by the processing unit 902, the first priority entry for the PTB packet; or if the source address and the destination address of the data packet are not an address pair of the service supported by the network element device, create, by the processing unit 902, the second priority entry for the PTB packet, where the first priority entry and the second priority entry each are the PMTU entry.

In an optional implementation, if the first packet is the neighbor discovery ND packet, the entry corresponding to the first packet is a neighbor cache entry, where content of the neighbor discovery ND packet includes the destination address and a media access control MAC address of the data packet, and the first priority entry and the second priority entry each are the neighbor cache entry.

In an optional implementation, the processing unit 902 is specifically configured to: determine whether a blank entry exists in the first table; and if the blank entry exists in the first table, create, by the processing unit 902, the first priority entry for the first packet in the blank entry; or if the blank entry does not exist in the first table, determine, by the processing unit 902, a target entry with shortest aging time in the second priority entry, create the first priority entry for the first packet, and overwrite the target entry.

In an optional implementation, the processing unit 902 is specifically configured to: determine whether a blank entry exists in the first table; and if the blank entry exists in the first table, create, by the processing unit 902, the second priority entry for the first packet in the blank entry; or if the blank entry does not exist in the first table, determine, by the processing unit 902, a target entry with shortest aging time in the second priority entry, create the second priority entry for the first packet, and overwrite the target entry.

In an optional implementation, the processing unit 902 is specifically configured to: determine whether the destination address of the data packet is the address of the service supported by the network element device; and create the entry corresponding to the first packet in a first area or a second area based on the determining result.

In an optional implementation, if the first packet is the PTB packet, the processing unit 902 is specifically configured to determine whether a source address and the destination address of the data packet are an address pair of the service supported by the network element device, where the PTB packet includes the source address and the destination address of the data packet, and a maximum transmission unit MTU value of the network element device.

In an optional implementation, the processing unit 902 is further configured to create a first table and a second table, where the first table corresponds to the first area, and the second table corresponds to the second area.

In an optional implementation, the processing unit 902 is specifically configured to: if the destination address of the data packet is the address of the service supported by the network element device, create, by the processing unit 902, a first entry in the first table for the first packet; or if the destination address of the data packet is not the address of the service supported by the network element device, create, by the processing unit 902, a second entry in the second table for the first packet, where a quantity of entries in the first table is not less than a quantity of addresses of services supported by the network element device.

In an optional implementation, if the first packet is the PTB packet, the entry corresponding to the first packet is a path maximum transmission unit PMTU entry, where content of the packet too big PTB packet includes the source address and the destination address of the data packet, and a maximum transmission unit MTU value of a routing device.

The processing unit 902 is specifically configured to: if the source address and the destination address of the data packet are the address pair of the service supported by the network element device, create, by the processing unit 902, a first entry in the first table for the PTB packet; or if the source address and the destination address of the data packet are not the address pair of the service supported by the network element device, create, by the processing unit 902, a second entry in the first table for the PTB packet, where the first entry and the second entry each are the PMTU entry.

In an optional implementation, if the first packet is the neighbor discovery ND packet, the entry corresponding to the first packet is a neighbor cache entry, where content of the neighbor discovery ND packet includes the destination address and a media access control MAC address of the data packet, and the first entry and the second entry each are the neighbor cache entry.

In an optional implementation, the first area and the second area are in a same table, and entries of the first area and the second area are continuously distributed in the same table; or entries of the first area and the second area are discontinuously distributed in the same table.

In an optional implementation, the processing unit 902 is specifically configured to: if the destination address of the data packet is the address of the service supported by the network element device, determine, by the processing unit 902, whether a blank entry exists in the first area; and if the blank entry exists in the first area, create, by the processing unit 902, a first entry for the first packet in the blank entry; or if the blank entry does not exist in the first area, create, by the processing unit 902, a first entry for the first packet in the second area.

In an optional implementation, if the first packet is the PTB packet, the entry corresponding to the first packet is a path maximum transmission unit PMTU entry, where content of the packet too big PTB packet includes a source address and the destination address of the data packet, and a maximum transmission unit MTU value of a routing device.

The processing unit 902 is specifically configured to: if the source address and the destination address of the data packet are an address pair of the service supported by the network element device, determine, by the processing unit 902, whether the blank entry exists in the first area; and if the blank entry exists in the first area, create, by the processing unit 902, a first entry for the PTB packet in the blank entry; or if the blank entry does not exist in the first area, create, by the processing unit 902, a first entry for the PTB packet in the second area, where the first entry is the PMTU entry.

In an optional implementation, if the first packet is the neighbor discovery ND packet, the entry corresponding to the first packet is a neighbor cache entry, where content of the neighbor discovery ND packet includes the destination address and a media access control MAC address of the data packet, and the first entry is the neighbor cache entry.

In an optional implementation, the processing unit 902 is specifically configured to: determine whether a blank entry exists in the second area; and if the blank entry exists in the second area, create, by the processing unit 902, the first entry for the first packet in the blank entry of the second area; or if the blank entry does not exist in the second area, determine, by the processing unit 902, a target entry with shortest aging time in the second area; and create, by the processing unit 902, the first entry for the first packet and overwrite the target entry.

In an optional implementation, the processing unit 902 is further configured to: if the destination address of the data packet is not the address pair of the service supported by the network element device, create, by the processing unit 902, the second entry in the second area for the first packet.

In a possible implementation, if the first packet is the PTB packet, the entry corresponding to the first packet is a path maximum transmission unit PMTU entry, where content of the packet too big PTB packet includes a source address and the destination address of the data packet, and a maximum transmission unit MTU value of a routing device.

The processing unit 902 is specifically configured to: if the source address and the destination address of the data packet are not an address pair of the service supported by the network element device, create, by the processing unit, a second entry for the PTB packet in the second area, where the second entry is the PMTU entry.

In an optional implementation, the processing unit 902 is specifically configured to: determine whether a blank entry exists in the second area; and if the blank entry exists in the second area, create, by the processing unit 902, the second entry for the first packet in the blank entry of the second area; or if the blank entry does not exist in the second area, determine, by the processing unit 902, a target entry with shortest aging time in the second area; and create, by the processing unit 902, the second entry for the first packet and overwrite the target entry; or if the blank entry does not exist in the second area, discard the first packet.

In an optional implementation, the aging time is remaining time for deleting the entry.

In an optional implementation, the processing unit 902 is specifically configured to: delete content of the target entry; and create an entry in the target entry for the first packet.

It should be noted that for specific content such as an information execution process of the units of the network element device, refer to the descriptions in the method embodiments shown in FIG. 4 to FIG. 8 in this application. Details are not described herein again.

Figure 10:
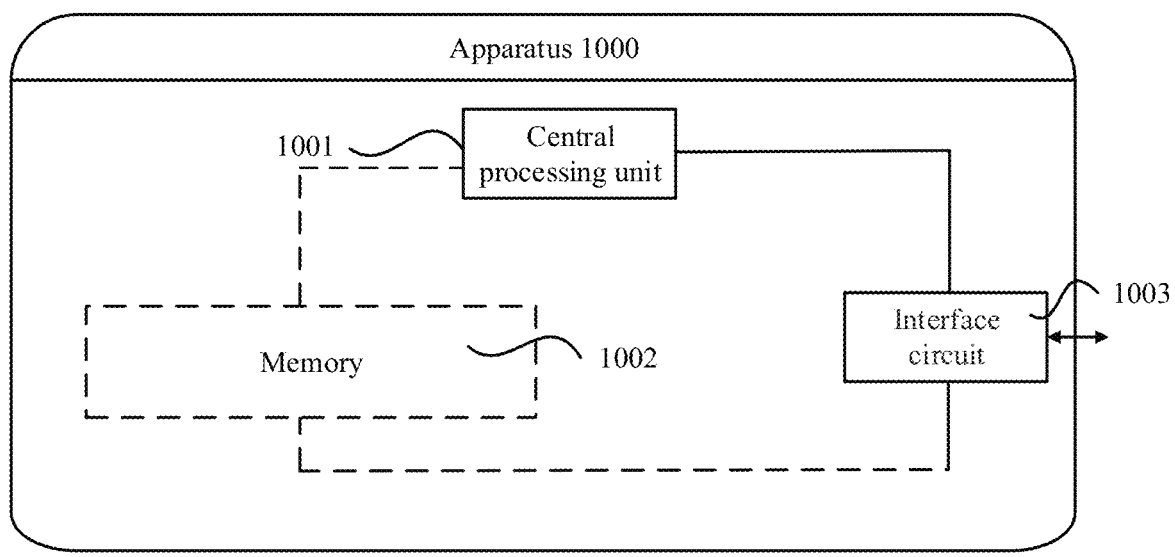
FIG. 10 is a schematic diagram of another embodiment of a network element device according to an embodiment of this application.

Refer to FIG. 10. An embodiment of this application further provides an apparatus 1000, where the apparatus 1000 may include one or more central processing units 1001 and an interface circuit 1003. Optionally, the apparatus 1000 may further include a memory 1002.

The memory 1002 may perform transitory storage or persistent storage. Further, the central processing unit 1001 may be configured to: communicate with the memory 1002, and perform, on a network element device, a series of instruction operations in the memory 1002.

In this embodiment, the central processing unit 1001 may perform signal processing operations performed by the network element device in the embodiments shown in FIG. 4 to FIG. 8, and details are not described herein again.

In this embodiment, specific function module division in the central processing unit 1001 may be similar to function module division in the units such as the receiving unit and the processing unit described in FIG. 9. Details are not described herein again.

It should be noted that for content such as an information execution process of the central processing unit 1001 of the apparatus 1000, refer to the descriptions in the method embodiments shown in FIG. 4 to FIG. 8 in this application. Details are not described herein again. The apparatus 1000 may be the network element device described in FIG. 9.

An embodiment of this application further provides a communication apparatus, including at least one processor and an interface circuit. The interface circuit is configured to: receive a signal from another communication apparatus other than the communication apparatus, and transmit the signal to the processor, or send a signal from the processor to another communication apparatus other than the communication apparatus, and the processor is configured to implement a procedure of the method in any one of FIG. 4 to FIG. 8 by using a logic circuit or executing code instructions.

An embodiment of this application further provides a chip or a chip system, where the chip or the chip system includes at least one processor and an interface circuit. The interface circuit is connected to the at least one processor by using a line. The at least one processor is configured to run a computer program or instructions, to perform the method described in any one of the possible implementations of the embodiments shown in FIG. 4 to FIG. 8. The interface circuit in the chip may be an input/output interface, a pin, a circuit, or the like.

In a possible implementation, the chip or the chip system described in this application further includes at least one memory, and the at least one memory stores the instructions. The memory may be a storage unit inside the chip, for example, a register or a cache, or may be a storage unit (for example, a read-only memory or a random access memory) of the chip.

An embodiment of this application further provides a computer storage medium, where the computer storage medium is configured to store computer software instructions used by the foregoing network element device, and the computer software instructions include a program designed for executing the network element device. The network element device may be the network element device described in FIG. 9.

An embodiment of this application further provides a computer program product, where the computer program product includes computer software instructions, and the computer software instructions may be loaded by a processor to implement a procedure of the method in any one of FIG. 4 to FIG. 8.

All or some of the foregoing embodiments may be implemented by using software, hardware, firmware, or any combination thereof. When the software is used to implement the embodiments, all or some of the embodiments may be implemented in a form of the computer program product. The computer program product includes one or more computer instructions. When computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, microwave, or the like) manner. The computer-readable storage medium may be any usable medium accessible by the computer, or a data storage device, such as a server or a data center, integrating one or more usable media. The usable medium may be a magnetic medium (such as a soft disk, a hard disk drive, or a magnetic tape), an optical medium (such as a DVD), a semiconductor medium (such as a solid-state drive Solid State Disk (SSD)), or the like.

It may be clearly understood by persons skilled in the art that, for the purpose of convenient and brief descriptions, for a detailed working process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to a conventional technology, or all or some of the technical solutions may be implemented in a form of a software product. The computer software product is stored in a storage medium and includes several instructions to enable a computer device (which may be a personal computer, a server, or a network device) to perform all or some of the steps of the methods described in embodiments of this application. The foregoing storage medium includes: any medium that can store program code, such as a USB flash drive, a removable hard disk drive, a read-only memory (ROM), a random access memory (RAM), a magnetic disk, or an optical disc.

What is claimed is:

1. A method for creating a data transmission entry, wherein the method comprises:
    creating, by a source node, a first table, wherein an entry of the first table has priority information used to indicate a priority of the entry;
    receiving, by the source node, a first packet sent by a destination node, wherein content of the first packet comprises a destination address of a data packet, wherein the data packet is from the source node and is different from the first packet;
    determining, by the source node, whether the destination address of the data packet is an address of a service supported by the source node;
    in response to the destination address of the data packet being the address of the service supported by the source node, creating a first priority entry in the first table for the first packet; and
    in response to the destination address of the data packet being not the address of the service supported by the source node, creating a second priority entry in the first table for the first packet;
    wherein the first packet is a packet too big (PTB) packet or a neighbor discovery (ND) packet.

2. An apparatus for creating a data transmission entry, wherein the apparatus comprises:
    at least one processor, and
    one or more memories coupled to the at least one processor and storing programming instructions for execution by the at least one processor to perform operations comprising:
    creating, a first table, wherein an entry of the first table has priority information used to indicate a priority of the entry;
    receiving a first packet from a destination node, wherein content of the first packet comprises a destination address of a data packet, wherein the data packet is from the source node and is different from the first packet;
    determining, whether the destination address of the data packet is an address of a service supported by the apparatus;
        in response to the destination address of the data packet being the address of the service supported by the apparatus, creating a first priority entry in the first table for the first packet; and in response to the destination address of the data packet being not the address of the service supported by the apparatus, creating a second priority entry in the first table for the first packet;
wherein the first packet is a packet too big (PTB) packet or a neighbor discovery (ND) packet.

3. The apparatus according to claim 2, wherein in response to the first packet being the PTB packet, the entry associated with the first packet is a path maximum transmission unit (PMTU) entry, wherein content of the PTB packet comprises a source address and the destination address of the data packet, and a maximum transmission unit (MTU) value of a routing device; and
wherein the operations further comprises:
in response to the source address and the destination address of the data packet being an address pair of the service supported by the apparatus, creating the first priority entry for the PTB packet; or
in response to the source address and the destination address of the data packet being not an address pair of the service supported by the apparatus, creating the second priority entry for the PTB packet, wherein the first priority entry and the second priority entry each are the PMTU entry.

4. The apparatus according to claim 2, wherein in response to the first packet being the ND packet, the entry associated with the first packet is a neighbor cache entry, wherein content of the ND packet comprises the destination address and a media access control (MAC) address of the data packet, and the first priority entry and the second priority entry each are the neighbor cache entry.

5. The apparatus according to claim 2, wherein the operations further comprises:
determining whether a blank entry exists in the first table, wherein the blank entry is an empty entry which has not been occupied by any information; and
in response to the blank entry existing in the first table, creating the first priority entry for the first packet in the blank entry; or
in response to the blank entry not existing in the first table, determining a target entry with a shortest aging time in the second priority entry; and creating the first priority entry for the first packet and overwriting the target entry.

6. The apparatus according to claim 2, wherein the operations further comprises:
determining whether a blank entry exists in the first table;
in response to the blank entry existing in the first table, creating the second priority entry for the first packet in the blank entry; or
in response to the blank entry not existing in the first table, determining a target entry with a shortest aging time in the second priority entry; and creating the second priority entry for the first packet and overwriting the target entry.

7. The apparatus according to claim 1, wherein the operations further comprises:
determining whether the destination address of the data packet is the address of the service supported by the apparatus; and creating the entry associated with the first packet in a first area or a second area based on the determining result.

8. The apparatus according to claim 7, wherein in response to the first packet being the PTB packet, determining whether a source address and the destination address of the data packet are an address pair of the service supported by the source node, wherein the PTB packet comprises the source address and the destination address of the data packet, and a maximum transmission unit (MTU) value of a routing device.

9. The apparatus according to claim 7, wherein the operations further comprises:
creating a first table and a second table, wherein the first table is associated with the first area, and the second table is associated with the second area.

10. The apparatus according to claim 9, wherein the operations further comprises:
in response to the destination address of the data packet being the address of the service supported by the apparatus, creating a first entry in the first table for the first packet; or
in response to the destination address of the data packet being not the address of the service supported by the source node, creating a second entry in the second table for the first packet, wherein
a quantity of entries in the first table is not less than a quantity of addresses of the service supported by the apparatus.

11. The apparatus according to claim 10, wherein in response to the first packet is the PTB packet, the entry associated with the first packet is a path maximum transmission unit (PMTU) entry, wherein content of the PTB packet comprises the source address and the destination address of the data packet, and a maximum transmission unit (MTU) value of the routing device;
wherein the operations further comprises:
in response to the source address and the destination address of the data packet being the address pair of the service supported by the apparatus, creating a first entry in the first table for the PTB packet; or
in response to the source address and the destination address of the data packet being not the address pair of the service supported by the apparatus, creating a second entry in the second table for the PTB packet, wherein the first entry and the second entry each are the PMTU entry.

12. The apparatus according to claim 10, wherein in response to the first packet being the ND packet, the entry associated with the first packet is a neighbor cache entry, wherein content of the ND packet comprises the destination address and a media access control (MAC) address of the data packet, and the first entry and the second entry each are the neighbor cache entry.

13. The apparatus according to claim 7, wherein the first area and the second area are in a same table, and entries of the first area and the second area are continuously distributed in the same table; or entries of the first area and the second area are discontinuously distributed in the same table.

14. The apparatus according to claim 13, wherein the operations further comprises:
in response to the destination address of the data packet being the address of the service supported by the apparatus, determining whether a blank entry exists in the first area; and in response to the blank entry existing in the first area, creating a first entry for the first packet in the blank entry; or in response to the blank entry not existing in the first area, creating a first entry for the first packet in the second area.

15. The apparatus according to claim 14, wherein in response to the first packet being the PTB packet, the entry associated with the first packet is a path maximum transmission unit (PMTU) entry, wherein content of the PTB packet comprises a source address and the destination address of the data packet, and a maximum transmission unit (MTU) value of a routing device; and wherein the operations further comprises:

in response to the source address and the destination address of the data packet being an address pair of the service supported by the apparatus, determining whether the blank entry exists in the first area; and in response to the blank entry existing in the first area, creating a first entry for the PTB packet in the blank entry; or in response to the blank entry not existing in the first area, creating a first entry for the PTB packet in the second area, wherein the first entry is the PMTU entry.

16. The apparatus according to claim 14, wherein in response to the first packet being the ND packet, the entry corresponding to the first packet is a neighbor cache entry, wherein content of the ND packet comprises the destination address and a media access control (MAC) address of the data packet, and the first entry is the neighbor cache entry.

17. The apparatus according to claim 14, wherein the operations further comprises:

determining whether a blank entry exists in the second area; and in response to the blank entry existing in the second area, creating the first entry for the first packet in the blank entry of the second area; or in response to the blank entry not existing in the second area, determining a target entry with a shortest aging time in the second area; and creating the first entry for the first packet and overwriting the target entry.

18. The apparatus according to claim 13, wherein the operations further comprises:

in response to the destination address of the data packet being not the address of the service supported by the apparatus, creating a second entry in the second area for the first packet.

19. The apparatus according to claim 2, wherein the first priority is higher than the second priority.

* * * * *